J. CLARKE.
CAR BRAKE AND APPLYING MECHANISM.
APPLICATION FILED JULY 2, 1915.
1,176,344.
Patented Mar. 21, 1916.
3 SHEETS—SHEET 3.
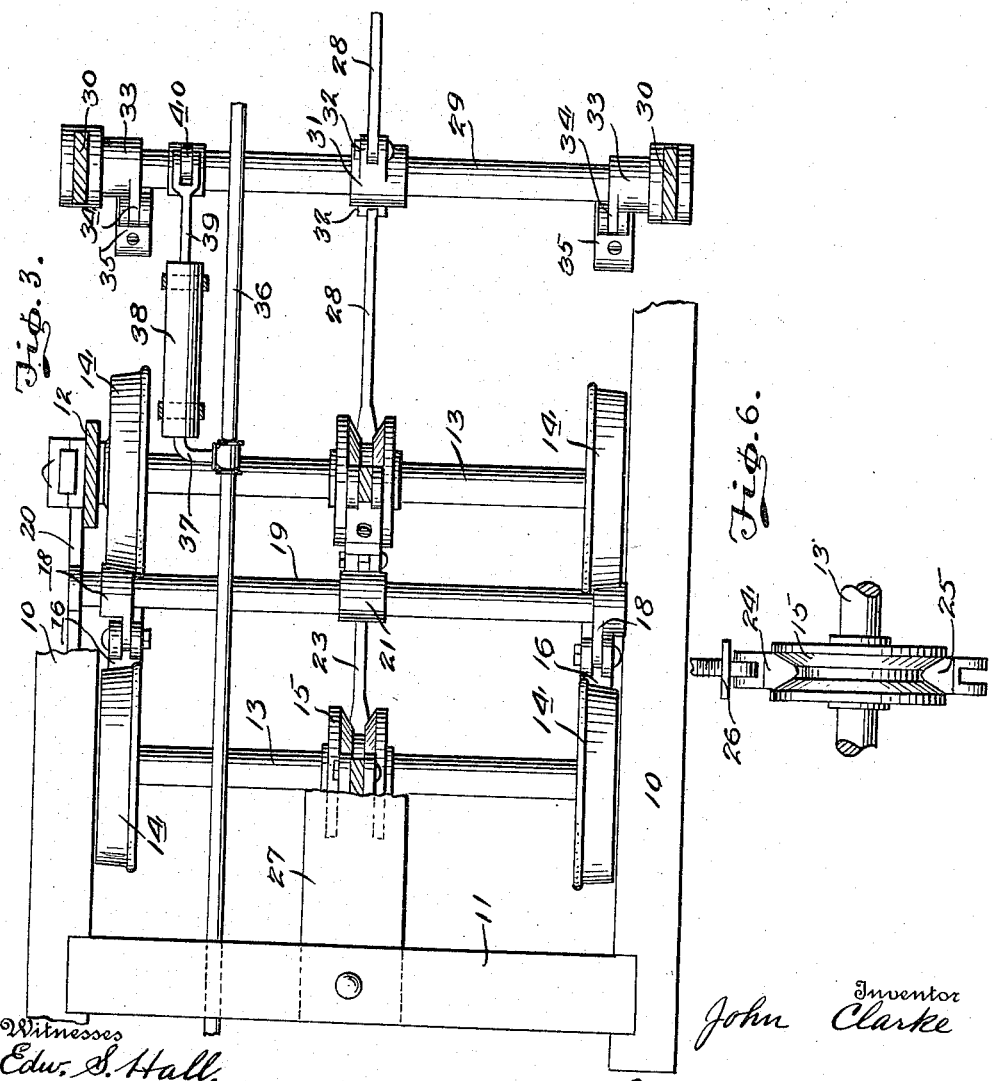
Witnesses
Edw. S. Hall.
Ross J. Woodward
Inventor
John Clarke
By Richard B. Owen.
Attorney

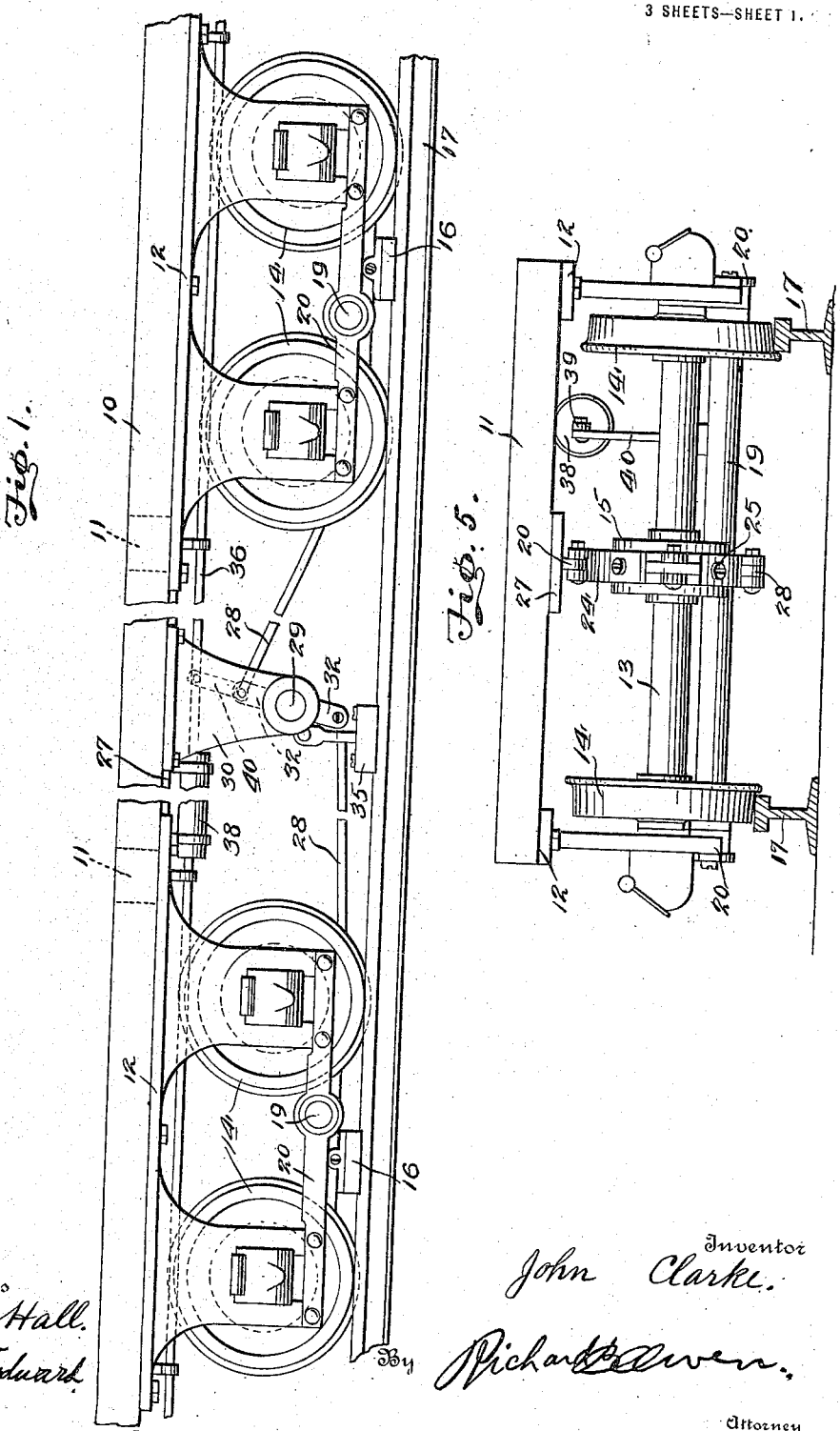

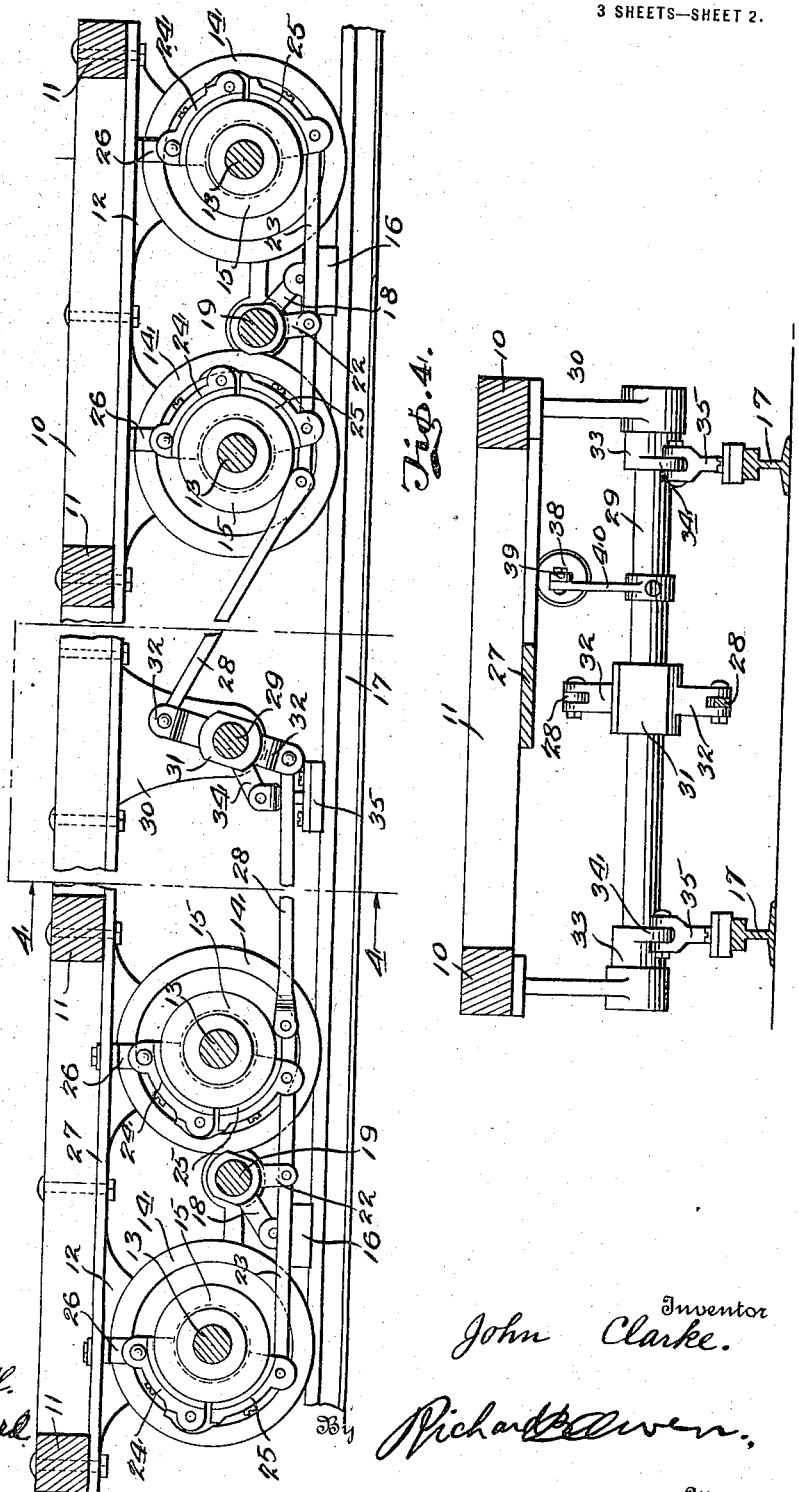

UNITED STATES PATENT OFFICE.

JOHN CLARKE, OF TAUNTON, MASSACHUSETTS.

CAR-BRAKE AND APPLYING MECHANISM.

1,176,344.  Specification of Letters Patent.  Patented Mar. 21, 1916.

Application filed July 2, 1915.  Serial No. 37,746.

*To all whom it may concern:*

Be it known that I, JOHN CLARKE, a citizen of the United States, residing at Taunton, in the county of Bristol and State of Massachusetts, have invented certain new and useful Improvements in Car-Brake and Applying Mechanisms, of which the following is a specification.

This invention relates to an improved brake mechanism for railway trains and the like and the principal object of the invention is to provide an improved brake mechanism for engaging the rails and for engaging drums mounted upon the wheel axle, the mechanism being so constructed that the brakes will be simultaneously applied to the axle drums and rails thus causing the train to be very rapidly brought to a standstill.

Another object of the invention is to so construct the brake shoes and axle drums that a very tight engagement will be caused between the brake shoes and drums when the brake mechanism is applied.

Another object of the invention is to provide an improved type of frame work for carrying the drum engaging shoes and rail engaging shoes, the frame work being strong and durable but at the same time comparatively simple in construction.

This invention is illustrated in the accompanying drawings, wherein:—

Figure 1 is a view showing the lower portion of a car in side elevation and provided with the improved brake mechanism, Fig. 2 is a longitudinal sectional view through the car shown in Fig. 1, Fig. 3 is a fragmentary view of one end portion of the car shown in Fig. 1, the view being partially in plan and partially in section, Fig. 4 is a sectional view taken along the line 4—4 of Fig. 2, Fig. 5 is a view showing the car in end elevation with the rails in section, Fig. 6 is a view in elevation of one of the axle drums with the brake shoes shown in place.

The car shown in this drawing is of the platform type and may represent the lower portion of a freight car or any other type of car, it being understood that this mechanism can be used in connection with passenger coaches, freight cars, platform cars or any other type of car. The side bars 10 of this car are connected by the cross bars 11 and rest upon the truck 12 which carries the axles 13 upon which the wheels 14 and drums 15 are rigidly mounted. It is of course understood that in a full size car the truck 12 will be of the standard construction and will be pivotally mounted so that the car can turn a curve in the track.

The brake shoes 16 which are intended to engage the rails 17 are positioned between the wheels of the truck and are carried by arms 18 which are rigidly mounted upon the end portions of the rocker shafts 19 extending between the wheels of the truck and rotatably supported by means of the bearing brackets 20 secured to the truck as shown in Fig. 1. It is necessary for these rocker shafts 19 to oscillate in order to bring the shoes 16 into and out of engagement with the rails 17 and therefore there has been provided sleeves 21 having lever arms 22 extending therefrom and connected with the draw rods 23. From an inspection of Figs. 1 and 2 it will be readily seen that when the draw rods 23 move longitudinally the rocker shafts 19 will be caused to rotate thus bringing the shoes into or out of engagement with the rails. These shoes are pivotally connected with the arms 18 and therefore the shoes will fit flat against the heads of the rails and thus have a very tight engagement with the rails.

In order to assist in stopping the car there has been provided the upper and lower brake shoes 24 and 25, the brake shoes 25 being pivotally connected with the brake shoes 24 and the brake shoes 24 being pivotally supported by means of the hanger bracket 26 carried by the longitudinally extending bar 27 which represents a suitable supporting means. The brake shoes 25 are connected with the draw rods 23 and it will thus be seen that when the draw rods are moved longitudinally through the medium of the links 28 the brake shoes will be brought into and out of engagement with the drums 15. From an inspection of Fig. 6 it will be seen that the brake shoes 24 and 25 are provided with tapered drum engaging faces which fit into the grooves of the drums and thus cause a tight working action greatly assisting the frictional engagement between the brake shoes and the drums.

The shaft 29 which might be termed the driving shaft for the brake mechanism is rotatably mounted in the bearing of the hanger bracket 30 and is provided with a sleeve 31 having arms 32 extending therefrom and pivotally connected with the inner end of the link 28. Therefore when the driving shaft 29 is rotated the link 28 will be drawn inwardly to bring the brake shoes 24 and 25 and brake shoes 16 into an operative position. When the shaft is rotated in the opposite direction it will move the links outwardly thus raising the brake shoes 16 and moving the brake shoes 24 and 25 out of engagement with the drums 15. The shaft 29 also carries sleeves 33 which have arms 34 extending therefrom and pivotally connected with the brake shoes 35 so that the brake shoes 35 will be held in a position to engage the rails 17 when the brake mechanism is moved to an operative position.

Pipe 36 which represents a train pipe of an air-brake system is provided with a branch 37 leading to the cylinder 38, the piston 39 of which is connected with the lever 40 extending from the driving shaft 29. This lever 40 is rigidly mounted upon the driving shaft 29 and therefore when the piston 39 moves, the driving shaft will be rotated and the brakes either applied or released according to the direction in which the rocker shaft 29 rotates.

What is claimed is:—

1. A brake mechanism comprising a car structure including supporting trucks, axles carried by said trucks, wheels rigidly mounted upon said axles, drums mounted upon said axles, a rocker shaft rotatably mounted and extending between the wheels of each truck, brake shoes connected with said rocker shaft for engaging the rails of a track when in an operative position, pivotally mounted brake shoes positioned to engage said drums when in an operative position, lever arms extending from said rocker shaft, draw bars connected with said lever arms and with the brake shoes of said drums, a rocker shaft rotatably mounted between the trucks of said car structure, brake shoes connected with said last mentioned rocker shaft for engagement with the rails of the track when in an operative position, arms extending from said last mentioned rocker shaft, links connecting the arms of the rocker shaft with said draw bars, and means for rotating the last mentioned rocker shaft to move said brake shoes into and out of an operative position.

2. A brake mechanism comprising a car structure including supporting trucks having axles and rotatably mounted rocker shafts, wheels rigidly mounted upon said axles, drums rigidly mounted upon said axles, a rocker shaft rotatably connected with said car structure between said trucks, arms extending from said rocker shaft, brake shoes pivotally connected with said arms for engaging the rails of a track when in an operative position, pivotally mounted brake shoes positioned to engage said drums when in an operative position, and means connecting said last mentioned rocker shaft with said last mentioned brake shoes and first mentioned rocker shafts whereby said last mentioned brake shoes and last mentioned rocker shafts will be moved into and out of an operative position when the rocker shaft is moved.

3. A brake mechanism comprising a car structure including trucks having axles, rocker shafts extending between said axles, brakes pivotally mounted adjacent said axles, brakes connected with said rocker shafts and positioned to engage the rails of a track, a rocker shaft mounted between said trucks, brakes carried by said rocker shaft and positioned to engage the rails of a track, means to rotate said rocker shaft, and means for connecting said rocker shaft with said rocker shafts and with said first mentioned brakes whereby movement of said rocker shaft will move said first mentioned brakes to prevent rotation of said axles and rotate said last mentioned rocker shafts to bring the brakes connected therewith into engagement with the rails of a track.

4. A brake mechanism comprising a car structure including supporting trucks having axles, supporting wheels rigidly mounted upon said axles, drums rigidly mounted upon said axles, pivotally mounted brake shoes positioned to engage said drums when in an operative position, a rocker shaft, brake shoes connected with said rocker shaft for engaging the rails of a track when in an operative position, and means connecting said rocker shaft with said first mentioned brake shoes for moving the brake shoes into and out of an operative engagement with the drums when said rocker shaft is rotated.

In testimony whereof I affix my signature in presence of two witnesses.

JOHN CLARKE.

Witnesses:
WILLIAM L. EVANS,
EDGAR O. LEACH.

Copies of this patent may be obtained for five cents each, by addressing the "Commissioner of Patents, Washington, D. C."